(No Model.) 2 Sheets—Sheet 1.
W. H. KNIGHT.
CONDUCTOR FOR ELECTRIC RAILWAYS.
No. 455,339. Patented July 7, 1891.
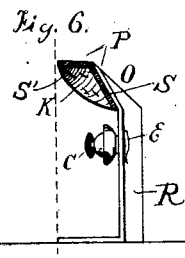
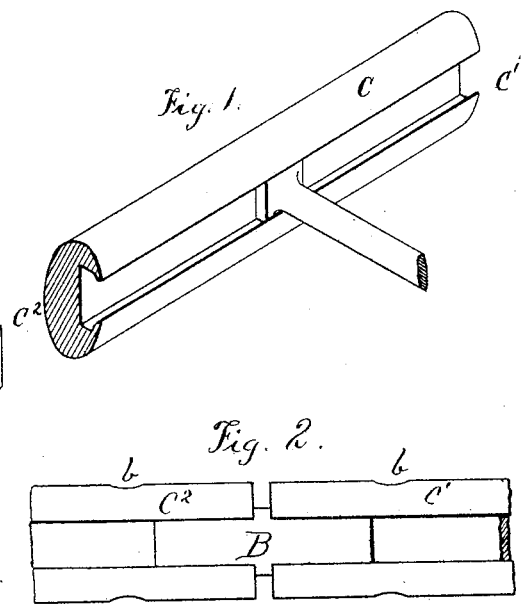
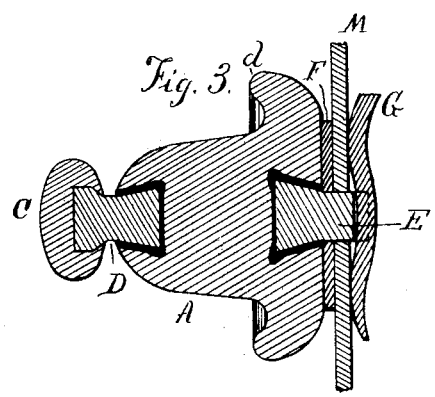
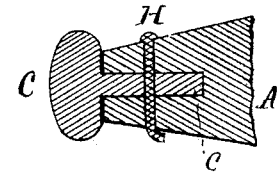
Attest
Albert E. Lynch
Wm. M. Monroe.
Inventor
Walter H. Knight
by Brodley & Knight
atty (No Model.) 2 Sheets—Sheet 2.
W. H. KNIGHT.
CONDUCTOR FOR ELECTRIC RAILWAYS.
No. 455,339. Patented July 7, 1891.
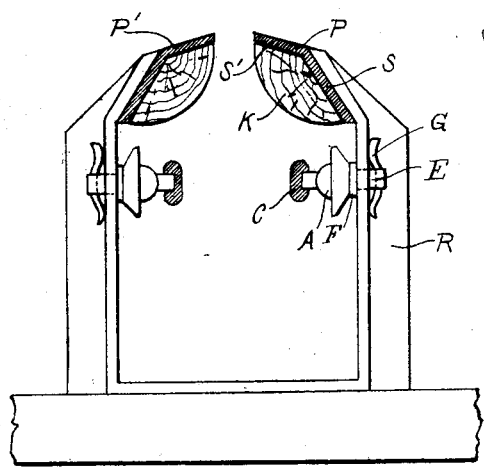
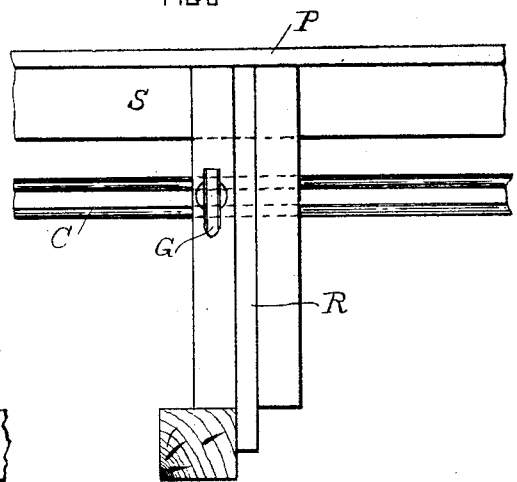
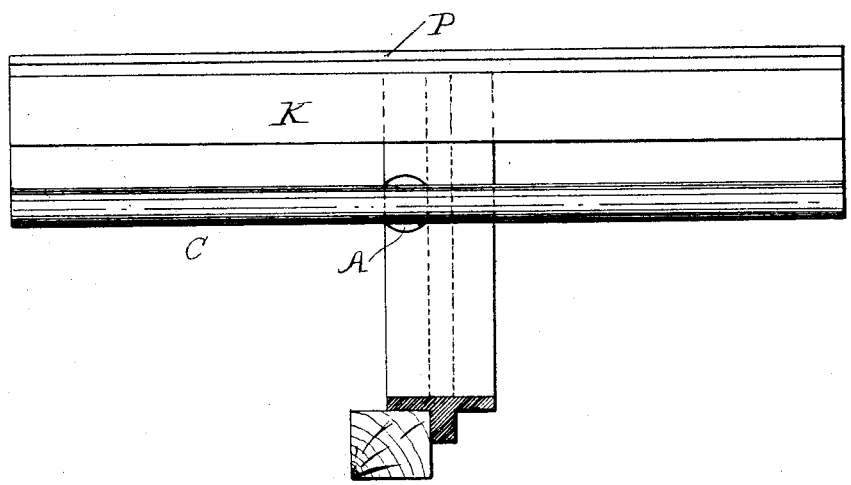
WITNESSES
INVENTOR

UNITED STATES PATENT OFFICE.

WALTER H. KNIGHT, OF CLEVELAND, OHIO.

CONDUCTOR FOR ELECTRIC RAILWAYS.

SPECIFICATION forming part of Letters Patent No. 455,339, dated July 7, 1891.

Application filed May 11, 1885. Serial No. 165,099. (No model.)

*To all whom it may concern:*

Be it known that I, WALTER H. KNIGHT, a citizen of the United States, residing at present at Cleveland, Ohio, have invented certain new and useful Improvements in Conductors for Electric Railways, of which the following is a specification, reference being made to the accompanying drawings, wherein—

Figure 1 is an isometric view of the conductor and connecting fish-plate. Fig. 2 is a back view of the fish-plate in position. Fig. 3 is a section of an insulator fastened to the conductor and to the walls of a conduit. Fig. 4 is a view of the fastening-key for the insulator. Fig. 5 is a modification, and Fig. 6 is a section, of a conduit with conductor and insulator in place. Fig. 7 is an enlarged view of Fig. 6 with both halves of the conduit shown. Fig. 8 is a side elevation of the conduit, and Fig. 9 is a vertical section through the center line of Fig. 7.

My invention consists, first, of a conductor for an electric railway having a bare contact-surface on which a contact shoe or brush extending from the electric locomotive is adapted to slide or travel, and having a posterior flange at an angle to said surface, to which insulating supports may be attached. An electrically-propelled vehicle and a contact device for which my invention is adapted are shown in my patent No. 305,731.

It consists, second, in an insulating support of vitreous material having supporting-pins sealed in it for connecting it to the conductor and to the wall of the conduit inclosing the conductor and having a flange at its base for protecting the conductor from moisture that may accumulate upon it or the walls of the conduit.

It consists, third, in a joint for connecting succeeding sections of conductor, so that they may freely expend and contract without interruption of the electrical connection, and also in a device for attaching the conductor to its insulator or support in such a manner that it may expand and contract independently of the metallic parts of the conduit.

In Fig. 1, C represents the conductor, which is made in the form of a channel-iron with the rounded surface of contact $c^2$, the walls of the channel $c'$ forming flanges, to which the insulating supports may be attached.

In the modification shown in Fig. 5 but a single flange $c$ is used. In the latter form the conductor is secured to insulator A by the flange entering the slit in the end of the insulator, a pin H going through to retain it in place, while in the form first described the channel of the conductor is dovetailed, so that a head D of the insulator may enter the channel and then be turned so as to firmly engage in its walls, thereby forming a slip-joint which permits the ready removal of any one of the insulators without interfering with the rest of the line. The succeeding sections of conductor C are connected, as shown in Fig. 2, by means of a fish-plate B, having, if desired, beveled edges corresponding to the dovetailed channel, which is driven into the adjacent ends of the conductors, so as to hold them firmly in alignment and yet allow of expansion and contraction. Dents or depressions $b\ b$ prevent too great movement of the fish-plate relatively to the conductors. By this construction the adjacent sections of conductor along the line may approach or recede from one another without interruption of the electrical connection, and, as will be described hereinafter, the conductors are also free to slide upon their supports. The value of this construction becomes apparent when the construction of the conduit is considered.

In the conduit construction, as shown in Figs. 6, 7, 8, and 9, there is a continuous slot-rail P, of metal, attached to a transverse metallic connection or yoke R, which extends across to the opposite side of the conduit and carries a similar slot-rail P'. The slot-rail P has, as shown, an inclined portion S and a part S' at an angle with S. It is also provided with an interior wooden lining K. The supports for the conductors are shown attached to the metallic yoke R. Now, as the metallic parts of the conduit are subject to expansion and contraction independently of the conductors, it becomes a matter of importance that the two should be capable of moving relatively to each other, especially when the conductor is of copper and the conduit is of iron.

The insulator is represented in Figs. 3, 4, and 5. It is of the shape shown at A, and is made preferably of porcelain, although glass or other non-combustible material may be employed. A metallic head D is sealed in one end of the insulator and is adapted to engage, as described, with the dovetailed channel of C. In the opposite end a shank E, similar to D, is sealed, forming a posterior extension from the insulator, which is adapted to extend through an opening in the walls M of the conduit and secured by a key G.

F is an intervening washer of lead or other deadening material, and the key G is made in the form of a spring, so as to constantly tend to draw the insulator down to its seat.

Fig. 6 shows an insulator attached, as described, to the metallic side of slotted conduit O.

The wooden lining is constructed as shown in my patent, No. 338,175, of March 16, 1886. Whether the wooden lining is employed or not, the slot-rail being inclined, there is a constant tendency for the moisture that may drip or run through the slot (which is of course flush with the surface of the street) to run down the walls of the conduit and tend to cause a leak of the current from conductor C to the metallic conduit. To prevent this leak I construct insulator A with a water-shed flange at its base, which is preferably curved outward in the form of a saucer, though any suitably-shaped flange may be employed, and the insulator extends out horizontally from the conduit, so that the flange occupies an upright position. By means of the insulator and its described connection it will be seen that the conductor can be completely supported from behind, leaving its contact-surface smooth, and that especially in the channel-shaped conductors the supports can be attached at any point along its length without difficulty and the sections readily be connected.

I am aware that electric line conductors have heretofore been supported by glass and porcelain insulators upon poles and in other situations. I have found, however, that the construction I have shown and described has a peculiar function never before contemplated in electric line distribution.

In order that a conductor may be properly supported in a conduit to permit of the traveling or sliding connection to be made between it and a vehicle on a roadway, it is necessary that a conductor be substantially at a uniform height and that the supports for it be placed at frequent intervals. It has been found that upon the insulators there is apt to be an excessive condensation of moisture, owing to the fact that the conduit is beneath the surface of the street, and that at certain times an excessive leakage is apt to occur at certain ones of the insulators. This leakage has a tendency to correct itself—that is, the heat engendered by the passage of the leaking current dries up the moisture which has given rise to it. In this process it has been found that unless a vitreous or non-combustible insulator is employed the heat sets fire to the insulator, reducing it to carbon, and the insulation is thereby destroyed.

What I claim as new, and desire to secure by Letters Patent, is—

1. The combination, in an electric railway, of the slotted conduit flush with the street-surface and having its inner surface adapted to shed water away from the slot, with the insulators placed at intervals, and having a water-shed flange, and the electric conductor connected thereto having a bare contact-surface parallel with said slot.

2. The combination, with the electric conductor having a bare contact-surface, of the conduit having its slot flush with the surface of the street or road and vitreous insulators attached to a metallic part of such conduit at intervals and having metallic connecting-heads in their outer ends, to which said conductor is connected.

3. The combination of a rigid electric conductor with bare contact-surface and an inclosing conduit therefor, with a series of supporting-insulators fastened to the interior of the conduit and having a sliding connection with the said conductor, so that it may move longitudinally thereon.

4. The combination, in an electric railway, of the supply-conductor having a bare contact-surface, an inclosing conduit therefor, a vitreous insulator supporting the conductor and attached to a metallic part of the conduit, and a deadening device between the insulator and the conduit.

5. The combination, in an electric railway, of the rigid supply-conductor having a bare contact-surface, an inclosing conduit therefor, vitreous insulators enlarged to form a water-shed flange attached at intervals to the interior of the conduit, and a metallic connection between the insulators and the conductor, permitting longitudinal movement of the latter upon the former.

6. In an electric railway, the combination, with a conduit having a slot-piece with one side inclined, so as to shed water away from the slot, and another side at an angle thereto, of an insulated conductor in the conduit, supported from the metallic substructure carrying the slot-piece by vitreous or non-combustible insulators.

7. In an electric railway, the combination of the inclined slot-piece of a conduit, a metallic substructure, a vitreous or non-combustible insulator projecting from the said substructure and carrying an electric conductor, and a water-shedding device between the conductor and the metallic conduit.

8. In an electric railway, the combination of the angular slot-rail, a substructure therefor having a transverse metallic connection to the opposite rail, a vitreous or non-combustible insulator, a supply-conductor, and a metallic connection between conductor and insulator, permitting movement of the conductor relatively to the insulator.

9. In an electric-railway conduit, the combination of an inclined angular slot-rail, a substructure to which it is attached, having a transverse metallic connection to the opposite slot-rail, a bared sectional conductor therein having an expansion-joint between the sections, and vitreous or non-combustible insulators for said conductor placed at intervals.

10. The combination of a conduit, an inclosed conductor having a bare contact-surface, and a posterior flange with supporting-insulators at intervals attached to the side wall of the conduit and connected to the said flange.

11. The combination, with a conduit and an inclosed conductor, of an intermediate supporting-piece connected to the conductor by a slip-joint and fastened to the conduit.

12. The combination, with a conduit and an inclosed conductor, of a vitreous or non-combustible insulator having a metallic head connected to the conductor by a slip-joint and a shank attached to the conduit by a fastening device.

13. In an electric-railway conduit, the combination of the inclined slot-rail, a transverse metallic connection to the corresponding slot-rail, a supply-conductor, and a supporting-insulator therefor attached to the said metallic connection provided with a water-shed and having a movable attachment to the conductor.

14. In an electric-railway conduit, the combination of the supply-conductor with a non-combustible insulator therefor, the insulator being attached to a metallic part of the conduit by a metallic shank and having a movable connection at one end to permit expansion of the conductor relatively to the conduit.

15. In an electric-railway conduit, the combination, with the slot-rail, of a metallic substructure having an opening therein, and an insulator with a shank fitting in said opening and at its opposite end attached to a supply-conductor.

16. In an electric railway, the combination, with the inclosing conduit, of a rigid conductor therein having a posterior dovetail connection with a vitreous or non-combustible insulator in the interior of the conduit permitting longitudinal movement of the conductor relatively to the conduit.

17. The combination, in an electric railway, of a slotted conduit, insulators placed horizontally within the conduit and provided with an upright water-shed flange, and a conductor supported in the conduit by said insulators.

18. The combination of a slotted conduit beneath the surface of the street, vitreous or non-combustible insulators supported at intervals from the side of said conduit and provided with an upright water-shed flange, and a conductor connected to the inner ends of said insulators.

19. The combination, in an electric-railway conduit, of a supply-conductor and an insulator therefor having a posterior extension into an opening in the side of the conduit.

20. In an electric-railway conduit, the combination of a slot-rail and substructure therefor, a supply-conductor, and an insulator therefor having a posterior extension into an opening in the side of the conduit below the slot-rail.

21. In a conduit for electric railways, the combination of a slot-rail provided with an insulating-lining and a conductor supported on vitreous or non-combustible insulators independently of the said lining.

22. In a conduit for an electric railway, the combination of a slot-rail having a wooden lining-rail, and a conductor supported in the conduit from a metallic part thereof by a vitreous or non-combustible insulator.

23. In an electric railway, the combination of an inclosing conduit, a conductor therein, an insulator therefor, and a spring-bearing for the said insulator.

24. In an electric railway, the combination of an inclosing conduit, a supply-conductor, a vitreous insulator, and a deadener, of lead, for said insulator.

25. In an electric railway, the combination of an inclosing conduit, a supply-conductor, a vitreous insulator having a spring-bearing, and a deadener therefor.

WALTER H. KNIGHT.

Attest:
E. M. BENTLEY,
ALBERT E. LYNCH.